United States Patent [19]

Dugal

[11] 4,436,778
[45] Mar. 13, 1984

[54] MULTILAYER TUBULAR BODY WITH UNCENTERED BARRIER LAYER

[75] Inventor: Jeffrey N. Dugal, Muncie, Ind.

[73] Assignee: Ball Corporation, Muncie, Ind.

[21] Appl. No.: 485,760

[22] Filed: Apr. 22, 1983

Related U.S. Application Data

[63] Continuation of Ser. No. 308,292, Oct. 5, 1981, abandoned.

[51] Int. Cl.³ .............................. B29F 1/10; B32B 9/04
[52] U.S. Cl. ...................................... 428/36; 264/515; 428/213; 428/542.8
[58] Field of Search ................. 428/36, 542.8; 264/515

[56] References Cited

U.S. PATENT DOCUMENTS

| | | | |
|---|---|---|---|
| 3,308,508 | 3/1967 | Schrenk | 425/133.1 |
| 3,354,506 | 11/1967 | Raley | 425/133.1 |
| 3,570,748 | 3/1971 | Coyle et al. | 264/346 |
| 3,645,838 | 2/1972 | Newman, Jr. et al. | 428/495 |
| 3,686,379 | 8/1972 | Gilbert | 264/529 |
| 3,821,182 | 6/1974 | Baird, Jr. et al. | 260/91.7 |
| 3,908,070 | 9/1975 | Marzolf | 428/474 |
| 3,912,843 | 10/1975 | Brazier | 428/474 |
| 3,924,051 | 12/1975 | Wiggins et al. | 428/520 |
| 4,048,428 | 9/1977 | Baird, Jr. et al. | 526/343 |
| 4,057,667 | 11/1977 | Wiggins et al. | 428/35 |
| 4,112,181 | 9/1978 | Baird, Jr. et al. | 428/336 |
| 4,123,576 | 10/1978 | Kobayashi et al. | 428/36 |
| 4,139,665 | 2/1979 | Herrero | 428/35 |
| 4,161,562 | 7/1979 | Yoshikawa et al. | 428/215 |
| 4,182,457 | 1/1980 | Yamada et al. | 428/35 |
| 4,247,583 | 1/1981 | Widiger et al. | 428/35 |
| 4,281,045 | 7/1981 | Sumi et al. | 428/36 |
| 4,288,488 | 9/1981 | Hisazumi et al. | 428/214 |
| 4,341,837 | 7/1982 | Katsuto et al. | 428/336 |

Primary Examiner—William R. Dixon, Jr.
Attorney, Agent, or Firm—Gilbert E. Alberding

[57] ABSTRACT

A multilayered structure is described that is useful in making containers, the structure having at least one low gas permeable layer specifically located in the multilayered structure so that there is substantial reduction in the formation of unwanted inclusions formed during coextrusion processes. In particular, the structure is a tubular body which comprises a plurality of layers of different polymeric materials united or bonded together, said structure having at least one uncentered layer of low gas permeability, said layer having an average thickness in the range of about 1 to 20 percent of the total thickness of the body. The structure may be readily made by forming a series of melted thermoplastic streams, enveloping the series of melted streams to successively form separate and defined layers one upon the other, and introducing a layer of low gas permeable material into the series proximate the exterior portion of the structure. The low gas permeable material may be polyvinylidene chloride copolymer, poly(vinyl alcohol-coethylene) or acrylonitrile-containing polymers.

13 Claims, 6 Drawing Figures

MULTILAYER TUBULAR BODY WITH UNCENTERED BARRIER LAYER

This is a continuation of application, Ser. No. 308,292, filed Oct. 5, 1981 now abandoned.

BACKGROUND OF THE INVENTION

This invention relates to polymeric bodies having a multilayered structure, and more particularly relates to multilayered thermoplastic tubular structures prepared by coextrusion techniques having a specifically positioned low gas permeable layer therein, said structures being suitable for producing articles including containers and the like.

The formation of multilayered structures is known wherein the separate layers contribute to the final properties. Many of these composite structures may be readily prepared by melting each individual component in separate zones and subsequently combining them in a predetermined configuration. In general, composite structures of two or more different polymeric materials may be readily coextruded to form a multilayered structure. In particular, a multilayered tubular structure may be readily made by conventional coextrusion processes wherein each thermoplastic material which is ultimately to form a layer in the composite is separately heated to its melt extrusion temperature by a conventional melt extruder and thereafter each melted material is forced by pressure feeding means into streams of melted thermoplastic material that enter a multimanifold die device provided with toroidal chambers and a common annular die orifice. The melted materials are fed into said device and form therein continuous annular layers as they exit the die orifice, each additional layer being fed to the device and issuing as annular coaxial layers that are essentially concentric with the initially formed annular layer. In effect, the device provides an annular flow of plastic materials, one strata of thermoplastic material being circumferentially deposited upon the preceding one to produce the multilayered tubular body.

In distributing thermoplastic materials into a multimanifold die device it has been found that several polymeric materials have the tendency to decompose or degrade when subjected to certain elevated temperatures, the elevated temperatures being reached oftentimes by heat from an adjacent coextruded material that must be processed at a higher melt extrusion temperature. Several polymers exhibit this tendency and, especially prone are the so-called low gas permeable polymers. These rather susceptible polymeric materials when subjected to elevated temperature have the propensity to partially degrade or decompose whereby unwanted gaseous products or inclusions are formed that become entrapped and are embedded in the polymeric interlayers or matrix. These inclusions often serve as nuclei or sites of buildup for the ultimate deposition of various organic and inorganic substances in a finished article. In particular, this deposition is noticeable with tubular forms and, especially, when they are further processed via blow-molding to form necked containers. It should be mentioned that in addition to the degradation or decomposition of these susceptible polymers there are apparently other phenomena at work that accentuate or cause a greater likelihood for this condition to exist, not only in frequency but in magnitude. Since there are a number of different polymeric materials that may be coextruded at the same time to form a given tubular body there is a marked tendency during any subsequent quenching or cooling for the various cojoined materials to contract or shrink at different levels resulting in stresses within the tubular structure. These stresses appear somehow to accelerate the formation of gaseous inclusions or bubbles that apparently display themselves. Seemingly, the differential contraction between the faster cooling outer layer where generally less shrinkage occurs and the slower cooling inner layer where generally more shrinkage occurs accelerates the buildup of these inclusions.

Where potentially degradable polymeric materials are incorporated as a layer or layers in tubular structures in accordance with this invention there is a marked improvement in properties advantageous to further fabrication including a substantial reduction in the tendency to form organic or inorganic inclusions. In essence, the multilayered tubular structure of the subject invention is novel and provides for unique properties and improvements not only in gas permeability but also in the mechanical properties of containers formed from said tubular structures including bottom wall sealability and neck configuration, which in turn, enables them to be useful for many purposes in the art, especially for parisons in blow molding containers as hereinafter set forth.

Although the particular problems resolved by the subject invention have not been appreciated or squarely addressed by the prior art, there are assuredly related and pertinent patents in this field. As a brief overview, a number of patents disclose methods of making tubular, multilayered structures as well as methods of blow modling certain thermoplastic structures. For example, the method of coextruding multilayered tubular bodies is described in U.S. Pat. No. 3,308,508 to Schrenk as well as U.S. Pat. No. 3,354,506 to Raley; multilayered, flexible structures having at least one layer of low gas permeability are described in U.S. Pat. No. 3,570,748 to Coyle, and U.S. Pat. No. 3,956,544 to Harrington as well as U.S. Pat. No. 4,139,665 to Herrero; and also rigid multilayered sheet structures are shown in U.S. Pat. No. 3,645,838 to Newman, et al., and U.S. Pat. No. 4,182,457 to Yamada, et al.; and a useful process for blow molding tubular bodies or parisons into high strength transparent hollow objects including containers is described in U.S. Reissue Pat. No. 26,956 to Wiley.

SUMMARY OF THE INVENTION

It is an object of this invention to provide a method of coextruding at least two diverse polymers wherein one is highly susceptible to thermal degradation whereby such degradation is substantially reduced.

It is another object of this invention to provide a composite preform structure having excellent mechanical strength.

Still another object of this invention is to provide a tubular parison structure having at least one barrier layer that is substantially free of organic and/or inorganic inclusions.

It is yet another object to provide an improved parison for blow molding into hollow objects, the objects having good sealability characteristics.

It is yet another object of this invention to minimize or reduce the effect of differential shrinkage for a multilayered structure, especially a tubular body having a susceptible barrier layer.

It is a further object of this invention to provide a process for making a tubular parison capable of allowing the manufacture of various types of containers having enhanced properties, including particularly low gas permeability, as well as containers having improved bottom wall sealability and neck-finish configuration.

Other objects, advantages and features of this invention will be apparent to those skilled in the art from the drawings and disclosure herein.

In one aspect of the present invention, briefly summarized, there is provided a self-supporting, coextruded thermoplastic body comprising a plurality of layers of different polymeric materials bonded together, said body having at least one uncentered layer of low gas permeability situated proximate the surface of said body. The particular body herein contemplated includes a tubular parison structure whereby the uncentered layer of low gas permeability is the penultimate polymeric layer or one proximate the outer surface of said tubular parison structure. The thickness of the low gas permeable layer may vary over a wide range and generally is dimensioned to occupy about 1 to 20 percent of the total thickness of the body, the body thickness being between about 0.10 to 0.5 inch with the barrier layer being between about 0.001 to about 0.1 inch.

Another aspect of the invention, briefly summarized, provides a process for producing coextruded, rigid tubular bodies with at least one barrier layer, said bodies having substantially reduced gaseous inclusions therein, said process comprising forming a series of melted streams of resinous materials, enveloping the series of melted streams to successively form separate and defined layers one upon the other, and introducing the barrier layer to envelope into the series proximate the exterior portion of said tubular bodies.

The nature, principle, utility and further features of this invention will be apparent from the following detailed description including specific examples of practice illustrating preferred embodiments of the invention.

DESCRIPTION OF THE PREFERRED EMBODIMENT

Figure 1:
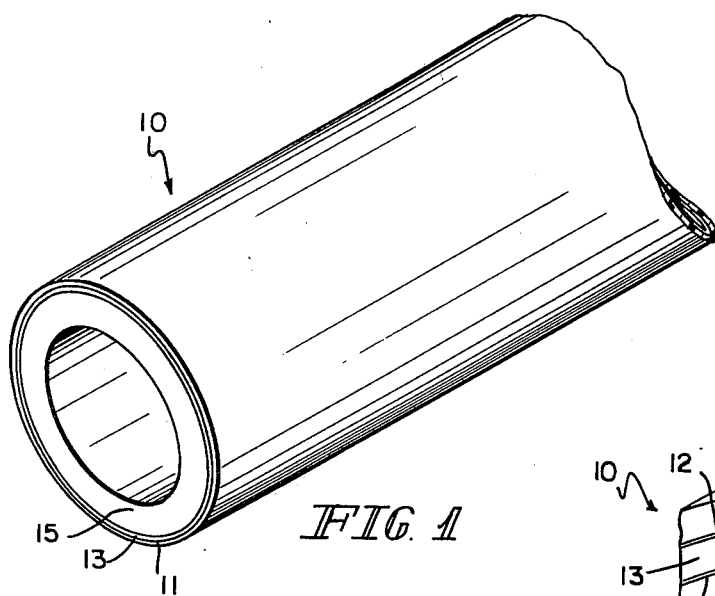
FIG. 1 is a perspective view of the tubular body of this invention.
Figure 2:
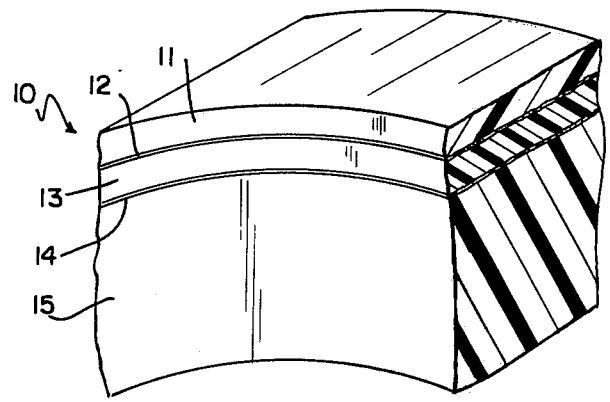
FIGS. 2 and 3 illustrate fragmentary cross sections of composite thermoplastic bodies of the subject invention.
Figure 5:
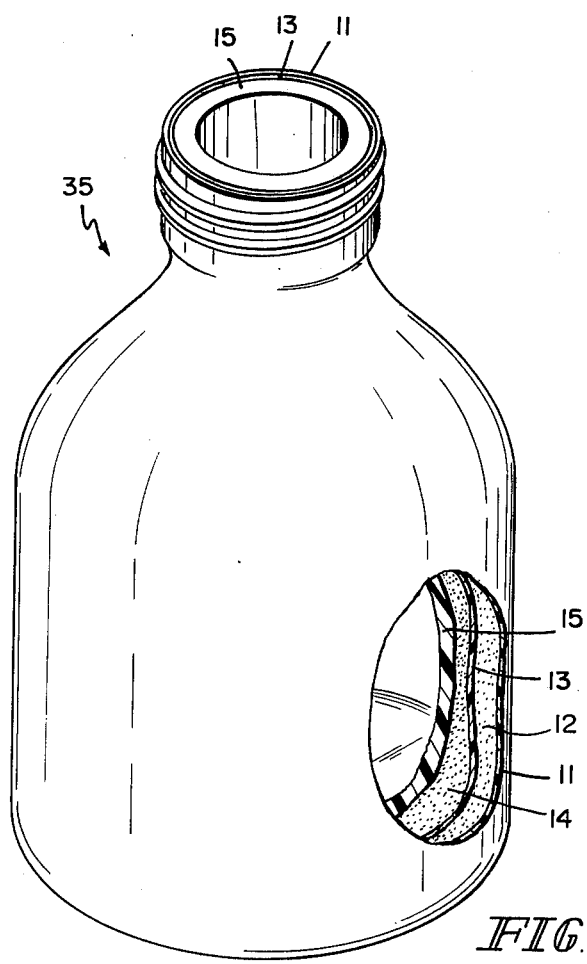
FIG. 5 is a view of a narrow neck container made from the tubular body of this invention.
Figure 3:
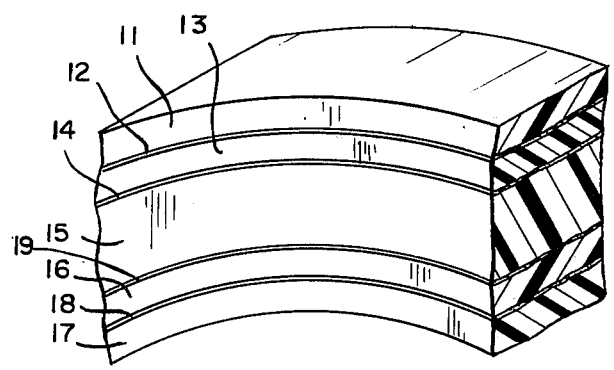

Turning first to FIGS. 1, 2 and 3 a sectional view of several rigid coextruded thermosplastic bodies are shown, each body itself being designated generally by reference numeral 10. The body 10 comprises a first or outer polymeric material 11 bonded by a first glue layer 12 to a so-called unbalanced or uncentered inner layer 13 which in turn is bonded to a second or inner polymeric material 15 by a second glue layer 14. As can be seen in FIG. 3, the inner polymeric material may comprise different polymeric materials such as shown by layers 15, 16 and 17 with inner glue layers 18 and 19. As disclosed herein, it has been found that such rigid structures render very favorable biaxially oriented containers or drawn-molded containers, which have a high barrier property to gases such as oxygen and are excellent in transparency, rigidity, mechanical strength and other physical properties.

In particular, the multilayered structure of the subject invention comprises a tubular thermoplastic body having a barrier layer sandwiched between other thermoplastic materials, with a glue or adhesive resin layer interposed between said thermoplastic layers, the barrier layer being proximate the exterior surface of said structure. When the barrier layer is so situated, it has been observed that there is less tendency for its decomposition or degradation and the formation of organic or inorganic inclusions which become oftentimes entrapped in the polymeric matrix during formation of a coextruded tubular structure. In the case of halogen-containing polymers the inclusions may often be hydrogen halides. Admittedly, when a tubular structure of polymeric material such as a single polymeric material or monolithic parison of polypropylene undergoes biaxial orientation during a stretch-and-blow operation the resulting article exhibits high strength as well as clarity. However, when such orientation is attempted with a multilayered tubular parison having a barrier layer or one of low gas permeability, it is found that the location of such a layer in a given multilayered parison in relation to the other layers becomes exceedingly critical in order to produce a container free or substantially free of imperfections or flaws due to such inclusions.

In general, it has been found that the low gas permeable or barrier layer should be positioned away from the central plane of the sheet or tubular structure and is most preferably located towards the exterior portion, especially within the first one-third of layers of a given multilayered preform structure. In this regard the barrier layer is best located proximate the outer surface of the structure, being within about 1 percent to 33 percent of the total thickness and the barrier layer itself occupying from about 1 percent to 20 percent of said total thickness. In one embodiment the barrier layer may have a thickness substantially equal to the thickness of the first outer thermoplastic layer. In a most preferred embodiment the barrier layer should be situated within the outer 15±1 percent of the total thickness of the tubular body. FIGS. 2 and 3 show one position of the barrier layer 13 and its relative thicknesses to the other layers within a given multilayered tubular body.

A wide range of thermoplastic materials, and preferably orientable materials, may be used for the polymeric layers, that is, for those polymeric layers other than the at least one barrier layer of low gas permeability. In particular, the thermoplastic materials include the solid olefins such as polyethylene, polypropylene and polybutylene. The polyolefins herein contemplated include polyethylene, polypropylene, resinous copolymers of ethylene and propylene and polymers of ethylene and/or propylene with minor proportions of olefinically unsaturated monomers such as the low molecular weight olefins having, for example, from 2 to 8 carbon atoms such as 1-butene, 1-pentene, 1-hexene, 1-heptene, and 1-octene. Other hydrocarbons useful for the copolymers herein are the copolymers of ethylene and propylene include divinylbenzene, allene, dimethallyl and isopentene. Also included in the thermoplastic materials for the layers that are not the barrier layer are polystyrene, polymethacrylates including polymethyl methacrylate and polybutyl methacrylate; polyvinyl alcohols; polyvinyl halides; polyvinyl acetals including polyvinyl trityral, polyallyl alcohol and polyallyl acetate; polyesters including polyethylene terephthalate and polycarbornates.

The term low gas permeability layer or barrier layer as used herein include polyvinylidene chloride and its copolymers; polyacrylonitrile and its copolymers including poly(acrylonitrile-co-styrene-co-butadiene); polyamides such as nylon; and hydrolized polymers of vinyl acetate and ethylene, especially saponified copolymers thereof. In general, the term polyvinylidene chloride copolymers as used herein mean a polymeric material which contains at least 50 percent of vinylidene chloride. A preferred barrier layer in accordance with this invention is polyvinylidene chloride and its copolymers. Copolymerizable monomers with vinylidene chloride include vinyl chloride, butadiene, acrylonitrile, vinyl acetate, methyl acrylate, ethyl acrylate, butyl acrylate, and methyl methacrylate. Terpolymers can also be employed, e.g., a terpolymer of vinylidene chloride, methyl methacrylate and vinyl chloride.

A relatively wide range of polymers and polymeric compositions are useful to increase the adhesion between the various thermoplastic layers as well as between the thermoplastic layers and the barrier layer. In making the tubular structures herein contemplated it is found most desirable to add adhesive or bonding layers between the barrier layer and the other thermoplastic layers. This has many advantages including the preventing of entrapping air in the coextruded material. In selecting adhering materials to serve as glue with respect to bonding polypropylene to vinylidene chloride polymers, a number of compositions may be used; compositions which are particularly advantageous are copolymers containing about 13 weight percent to about 35 weight percent vinyl acetate with from about 87 weight percent to about 65 weight percent ethylene, copolymer compositions of from about 20 to 30 weight percent ethyl acrylate with from about 80 to 70 weight percent ethylene, copolymer compositions from about 20 to 30 weight percent isobutyl acrylate with from about 80 to ¿weight percent of ethylene and chlorinated polyethylene containing from about 25 to 40 weight percent chlorine and copolymers of butadiene-styrene. Suitable polymers or polymeric compositions may be readily selected by determining the bonding strength of the particular layer combination, usually by using peel strength tests.

Figure 4:
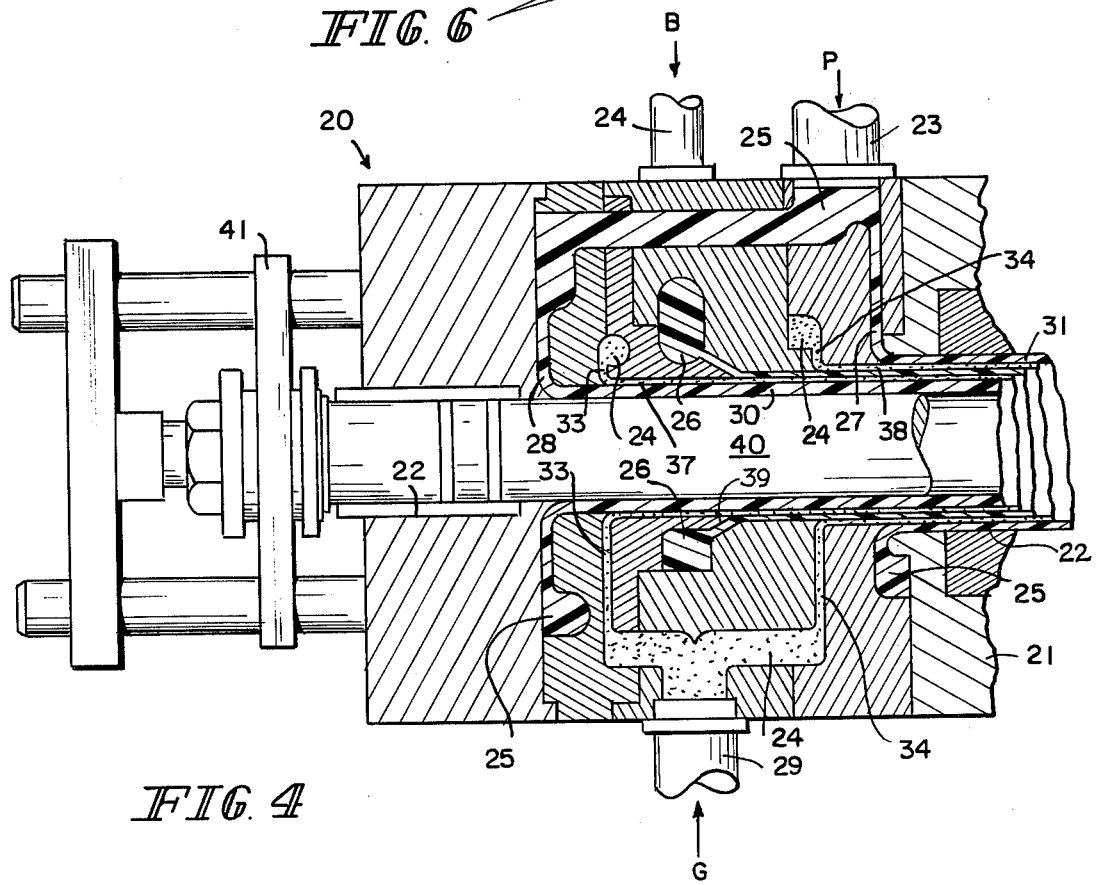
FIG. 4 is a cross-sectional view of a multimanifold die assembly for making the article of this invention.

In FIG. 4 there is illustrated a sectional view of a multimanifold die device useful in forming the subject article, said device being generally designated by the reference numeral 20, the device 20 comprising a die body 21 having defined therein a centrally disposed aperture 22. Located within aperture 22 is a mandrel 40 equally spaced from the walls of the aperture 22 and secured to the device 20 by retaining member 41. Formed within the body 21 is first and second conduits 23 and 24 which carry melted thermoplastic and barrier materials P and B, respectively, into first and second plenums 25 and 26. Thermoplastic material P is divided into two streams that open into aperture 22, an inner stream 30 and an outer stream 31, said streams issuing from annular slots 28 and 27 that communicate with the plenum 25. A conduit 29 communicates with a third plenum 24 for directing a suitable adhesive or glue material G. From viewing FIG. 4 it will be noted that the glue material G forms two streams, an inner stream 37 and an outer stream 38, said streams coming from glue slots 33 and 34. Thus, the barrier material B is carried within the die body 21 by plenum 26 which, in turn, communicates with the aperture 22 by means of barrier slot 39. It will be appreciated that a number of die configurations may be used to form the article herein, the aforementioned being just one embodiment.

Figure 6:
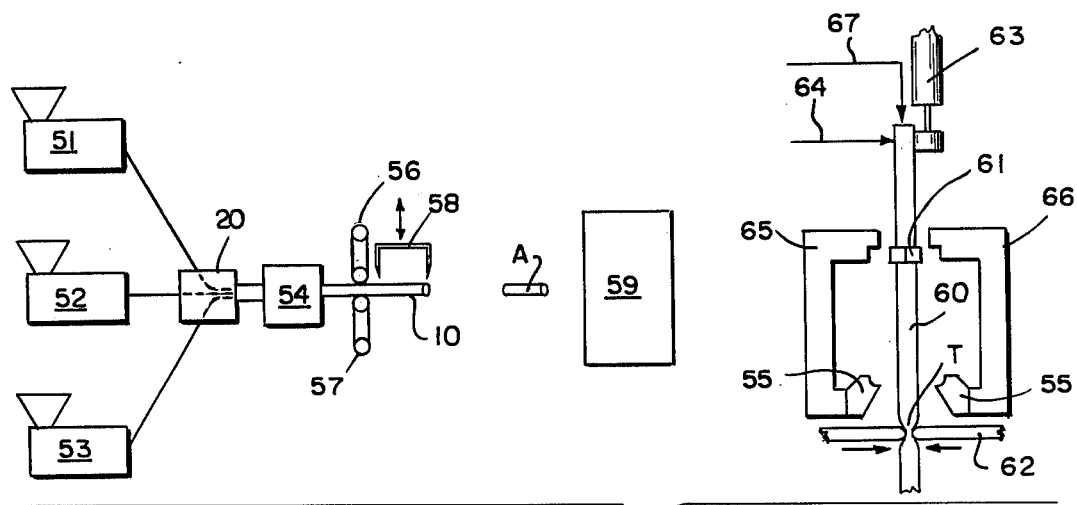
FIG. 6 depicts a schematic representation of the apparatus for forming containers like FIG. 5 from tubular bodies of this invention.

The formation of a biaxially oriented container shall now be described. With reference to FIG. 6 there is shown a tubular structure 10 being formed by passing molten thermoplastic materials from three separate coventional screw-type extruders 51, 52 and 53 which contain thermoplastic material, glue, and barrier material, respectively, to the multimanifold die device 20 where melted thermoplastic materials are united into the tubular body 10 as previously described and, thereafter, the molten materials are allowed to pass into a vacuum cooling and sizing chamber 54. It will be appreciated that some materials are required to be at an elevated melt temperature, such as for polypropylene, in comparison with another material such as a low gas permeable layer, and the time required to substantially cool the former material may not be ample whereby there results degradation or decomposition of the low gas permeable material. In the case of polyvinylidene chloride and its copolymers as a low gas permeable layer it is believed that inorganic materials such as hydrogen chloride may be formed as well as other organic ingredients. It follows from this invention that the thermally sensitive barrier or low gas permeable layer is situated in the multilayered structure proximate the outer surface as defined herein whereby it may be quenched or cooled quickly. Furthermore, this particular location of the barrier layer, that is proximate the outer surface, also reduces the forces due to the differential shrinkage of the inner and outer layers and, therefore, further curtails the tendency of the gaseous inclusions to form. As a result, the formation of gaseous inclusions is substantially reduced in making such multilayered tubular bodies in accordance with this invention.

After being cooled the solidified tubular body is pushed via belts 56 and 57 into cutting means 58 where it is severed into individual open end parison preforms designated A. Thereafter, the preform A is passed through an air oven 59 where it is heated to a predetermined orientation temperature and the preform is then transferred by means not shown to a thread-forming head 61 whereby the thread and finish configuration is readily formed. The parison A is grasped at the other end thereof by gripping fingers 62, which are brought together by means of cylinders or cams not shown, and relative movement effected between thread-forming head 61 and gripping fingers 62 by means of raising head 61 through the action of cylinder 63 to stretch the parison to the elongated condition depicted by reference character 60. Thereafter, preblow air is introduced through line 64 and mold halves 65 and 66 concurrently close on the thus-stretched parison 60. Sealing and severing inserts 55 in mold halves 65 and 66 allow the mechanical operation of bringing the parison walls into intimate contact and severing the parison. It will be appreciated that since the innermost portion of the multilayered structure is substantially one polymeric material, e.g., polypropylene, that this action brings together a larger area of common polymeric material which readily seals itself to form the bottom end wall. It has been observed that if a low gas permeable layer is proximate the inner wall, as opposed to the outer wall, proper sealing does not take place due in part, to its inherent characteristics of being readily squeezable from the seal and the less amount of area between joining common polymeric materials. At any rate, gripping fingers 62 then retract to allow the several tail portion T to fall free from the remainder of the parison. Thereafter, the main blow air is then introduced through line 67. By this process the preform is biaxially stretched. A preferred method of closing and sealing a comparable parison, for instance, is shown and described in U.S. Pat. No. 3,686,379 to Gilbert, the disclosure of which is hereby incorporated by reference.

The following example is presented in order to illustrate further the particular tubular structure and method to form the same in accordance with this invention.

A series of coextruded tubular bodies, A through E, were made in which a layer having low gas permeability was positioned at various levels within the layered structure. In making these tubular bodies three separate extruders were used in a coextrusion line, the first (1) extruder hopper containing polypropylene copolymer having a density of about 0.90 and a crystalline melting point of about 330° F., the second (2) containing a copolymer of vinylidene chloride and vinyl chloride having a density of about 1.71 and a crystalline melting point of about 300° F.; and the third (3) extruder containing a resinous, adhesive material comprising about 40 percent styrene and 60 percent butadiene. All three materials were melted and pumped by the extruders to a multimanifold die head wherein the three materials were coextruded to form continuous annular layers, each layer being fed to the die head and issuing as annular coaxial layers that were essentially concentric with the initially formed layer.

Each extruded tubular body thus formed had an outside diameter of about 1.25 inch and a wall thickness of about 0.230 inch. Each tubular body was cooled in a vacuum sizing and quenching chamber using a coolant at about 40° F., and thereafter cut into ten inch lengths. In order to demonstrate the criticality of the location of the barrier layer, viz., a copolymer of vinylidene chloride (about 85 percent) and vinyl chloride (about 15 percent), five different placements were made. The barrier layer was bonded via the abovementioned adhesive material to both an inner and an outer layer of polypropylene. The barrier material itself as well as the other materials were maintained substantially at the same quantitative level in each placement. The following table shows the distance the barrier was located from the outer surface and indicates the average number of inclusions per foot as well as the estimated average inclusion volume. By multiplying the average number of inclusions per foot and estimated average inclusion volume and dividing by the inclusion volume per foot of Sample A the relative inclusion volume per foot is determined.

TABLE

| | DESCRIPTION | Samples | | | | |
|---|---|---|---|---|---|---|
| | | A | B | C | D | E |
| 1. | Average Outer Polypropylene + Glue Layer Thickness, mils | 22 | 62 | 99 | 168 | 183 |
| 2. | Average Number of Inclusions per Foot | 1.6 | 10.4 | 26.4 | 11.6 | 38.4 |
| 3. | Estimated Average | 439 | 12800 | 31300 | 6800 | 531 |
| 4. | Inclusion Volume Relative Inclusion Volume per Foot | 1.0 | 190 | 1200 | 110 | 29 |

It can be seen from the above table that when the barrier layer is proximate the outer surface, that is, if the barrier layer is within the outer about one-third of the total thickness, or more preferably within the outer about one-quarter of the total thickness of the tubular body there is a marked decrease in the relative inclusion volume per foot.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being respective or otherwise limiting of the present invention.

I claim:

1. A nonflexible thick-walled tubular article with a wall thickness in excess of 0.1 inch having a heat-degradable polyvinylidene barrier layer with a marked decrease in relative volume of entrapped inclusions per given length, said article capable of being biaxially oriented into a container possessing low gas permeability comprising at least three cojoined polymeric layers with at least one intermediate polymeric layer being a polyvinylidene chloride barrier layer, said article being formed by simultaneously coextruding and bonding the polymeric layers together as a series of melted streams with the intermediate polyvinylidene chloride barrier layer being located proximate the exterior surface thereof, the outer polymeric layer being less thick than the article portion within the polyvinylidene chloride barrier layer, and quenching said series of melted streams from the outer exterior surface of said series proximate said polyvinylidene chloride barrier layer, said polyvinylidene chloride barrier layer being located within the outer about one percent to 33 percent of the total thickness and having a thickness of from about 1 percent to about 20 percent of the total thickness of the cojoined, multilayered tubular article.

2. The tubular article as in claim 1 wherein the polyvinylidene chloride layer having the barrier properties has an average thickness of from about 2 percent to about 12 percent of the total thickness of the article.

3. The tubular article as in claim 1 wherein the polyvinylidene chloride layer having barrier properties has an average thickness of from about 3 percent to about 10 percent of the total thickness of the article.

4. The tubular article as in claim 1 wherein the polyvinylidene chloride layer having barrier properties is within the outer about one-quarter total thickness of the article.

5. A nonflexible multilayered tubular body capable of being biaxially oriented into a container possessing low gas permeability, said body having at least three polymeric layers including at least inner and outer layers of thermoplastic material selected from a group comprising polyolefins, polystyrenes and polyesters and an intermediate polyvinylidene chloride barrier layer therein, said body having a wall thickness in excess of 0.1 inch with a marked decrease in the relative volume of entrapped inclusions per given length and being formed by the process of providing a series of melted streams of the polymeric materials, enveloping said series of melted streams to form said tubular body with separate and defined layers one upon the other, and introducing the intermediate polyvinylidene chloride barrier layer into said series proximate the exterior portion of said tubular body, said polyvinylidene chloride barrier layer being located within the outer one-third thickness of layers, and thereafter quenching said series of melted streams from the outer exterior surface of said series proximate said barrier layer to form a cojoined multilayered tubular body.

6. The tubular body of claim 5 wherein the barrier layer is introduced within the outer about one-quarter series of layers.

7. The tubular body of claim 5 wherein the barrier layer is introduced to form an average thickness of between about 1 percent to about 20 percent of the total thickness of the tubular body.

8. A method of substantially reducing gaseous inclusions in coextruding a solid nonflexible tubular body having at least three polymeric layers including inner and outer layers of thermoplastic material selected from a group comprising polyolefins, polystyrenes, and polyesters, and an intermediate polyvinylidene chloride barrier layer therein, said body having a wall thickness of about 0.1 inch to about 0.5 inch and being capable of being axially oriented into a container possessing low gas permeability, which comprises forming a series of melted streams of the polymeric materials, enveloping the series of melted streams to form separate and defined cojoined tubular layers one upon the other, and introducing the polyvinylidene chloride barrier layer intermediately within said series and proximate the exterior surface of said tubular layers, said polyvinylidene chloride barrier layer being within the outer 1 percent to 33 percent of the total thickness of the cojoined tubular layers and having a thickness of from about 1 percent to about 20 percent of total thickness of the cojoined tubular layers, and thereafter quenching said series of cojoined tubular layers from their outer exterior surface proximate said barrier layer to form a cojoined multilayered solid thick-walled body.

9. A method as recited in claim 8 wherein the barrier layer is introduced within the outer about one-quarter series of layers.

10. A method as in claim 8 wherein the barrier layer is introduced to form an average thickness of between about 2 and 12 percent of the total thickness of the tubular body.

11. A method as in claim 8 wherein the barrier layer is introduced to form an average thickness of between about 3 and 10 percent of the total thickness of the tubular body.

12. A method of substantially reducing inclusions in coextruding a thick-walled tubular article having a wall thickness in excess of 0.1 inch with an intermediate layer of polyvinylidene chloride and being adapted to form a thick-walled parison capable of biaxial orientation into a container with low gas permeability, comprising:

forming a series of melted streams of a thermoplastic material selected from a group comprising polyolefins, polystyrenes, and polyesters, forming a melted stream of polyvinylidene chloride, forming the melted streams of the thermoplastic material into at least two, thick-walled tubular, coaxial streams with the outer tubular stream being less thick than the inner tubular stream, forming the melted stream of polyvinylidene chloride into a thin-walled tubular stream coaxially arranged with the tubular streams of thermoplastic material and introducing the tubular stream of polyvinylidene chloride intermediately within the melted streams of thermoplastic material so it lies proximate the exterior surface of the cojoined streams, and quenching the cojoined tubular streams of thermoplastic material and polyvinylidene chloride at their exterior surface to reduce the degradation of the polyvinylidende chloride and the formation of entrapped inclusions in the resulting tubular article.

13. The method of claim 12 wherein the outer tubular stream of thermoplastic material has one-half the thickness of the inner tubular stream of thermoplastic material and the tubular stream of polyvinylidene chloride has a thickness of about 1 percent to about 20 percent of the total thickness of the cojoined tubular streams.

* * * * *